United States Patent
Zhang

(10) Patent No.: US 11,221,417 B2
(45) Date of Patent: Jan. 11, 2022

(54) RECOVERY OF HIGH PRECISION POSITION AFTER GNSS OUTAGE

(71) Applicant: Samsung Electronics Co., Ltd., Suwon-si (KR)

(72) Inventor: Wentao Zhang, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 16/298,948

(22) Filed: Mar. 11, 2019

(65) Prior Publication Data

US 2020/0209407 A1    Jul. 2, 2020

Related U.S. Application Data

(60) Provisional application No. 62/785,627, filed on Dec. 27, 2018.

(51) Int. Cl.

| G01S 19/40 | (2010.01) |
|---|---|
| G01S 19/07 | (2010.01) |
| G01S 19/32 | (2010.01) |
| G01S 19/05 | (2010.01) |
| G01S 19/44 | (2010.01) |

(52) U.S. Cl.
CPC .............. G01S 19/40 (2013.01); G01S 19/05 (2013.01); G01S 19/07 (2013.01); G01S 19/32 (2013.01); G01S 19/44 (2013.01)

(58) Field of Classification Search
CPC .......... G01S 19/32; G01S 19/40; G01S 19/43; G01S 19/44
See application file for complete search history.

(56) References Cited

U.S. PATENT DOCUMENTS

| 9,116,231 B2 | 8/2015 | Vollath et al. |
| 2016/0370467 A1 | 12/2016 | Gao et al. |

(Continued)

FOREIGN PATENT DOCUMENTS

| CN | 105510945 A | * | 4/2016 |
| CN | 109655849 A | * | 4/2019 |
| WO | 2017/160465 A1 | | 9/2017 |

OTHER PUBLICATIONS

W. Zhang et al., Investigation of Combined GPS/GALILEO Cascading Ambiguity Resolution Schemes, ION GPS/GNSS, p. 2599-2610 Sep. 2003 (Year: 2003).*

(Continued)

*Primary Examiner* — Bernarr E Gregory
*Assistant Examiner* — Fred H Mull
(74) *Attorney, Agent, or Firm* — Lewis Roca Rothgerber Christie LLP

(57) ABSTRACT

A system and method for estimating a position. In some embodiments, the method includes receiving global navigation satellite system signals from a plurality of global navigation satellite system satellites; receiving a plurality of reference station measurements; receiving external error correction data; generating first position estimates with a Real-Time Kinematic method, based on the global navigation satellite system signals and on the reference station measurements; and generating second position estimates with a Precise Point Positioning method, based on the global navigation satellite system signals, on the external error correction data, and on first position estimates.

18 Claims, 4 Drawing Sheets

(56) References Cited

U.S. PATENT DOCUMENTS

| | | |
|---|---|---|
| 2017/0176600 A1 | 6/2017 | Vollath et al. |
| 2017/0269228 A1 | 9/2017 | Dai et al. |
| 2017/0269231 A1* | 9/2017 | Dai .................. G01S 19/32 |
| 2017/0299728 A1* | 10/2017 | Lie .................. G01S 19/43 |
| 2018/0188380 A1* | 7/2018 | Venkatraman ......... G01S 19/43 |
| 2019/0196022 A1* | 6/2019 | Rezaei ................ G01S 19/43 |

OTHER PUBLICATIONS

English Translation of CN 105510945 A (Year: 2021).*
English Translation of CN 109655849 A (Year: 2021).*

* cited by examiner

RECOVERY OF HIGH PRECISION POSITION AFTER GNSS OUTAGE

CROSS-REFERENCE TO RELATED APPLICATION(S)

The present application claims priority to and the benefit of U.S. Provisional Application No. 62/785,627, filed Dec. 27, 2018, entitled "METHOD AND APPARATUS FOR FAST HIGH PRECISION POSITION FIX AFTER GLOBAL NAVIGATION SATELLITE SYSTEM (GNSS) OUTAGE", the entire content of which is incorporated herein by reference.

FIELD

One or more aspects of embodiments according to the present disclosure relate to position estimation based on a global navigation satellite system, and more particularly to a system and method for accelerated Precise Point Positioning convergence.

BACKGROUND

Precise Point Positioning may be used to estimate, with relatively high precision, the position of a global navigation satellite system receiver. This method uses signals from global navigation satellite system satellites, along with external error correction data, to achieve relatively high precision. After an outage, e.g., when a vehicle using global navigation satellite system receiver drives through a tunnel or other area in which too few global navigation satellite system satellites are within line of sight of the receiver to obtain a position estimate based on the global navigation satellite system signals, the Precise Point Positioning method may take a considerable amount of time to re-converge to a high precision estimate. As such, the precision of position estimates generated during an interval of time after the outage may be poor.

Thus, there is a need for an improved method for converging to a high precision position estimate in a Precise Point Positioning system.

SUMMARY

According to some embodiments of the present disclosure, there is provided a method for estimating a position of a global navigation satellite system receiver, the method including: operating in a first state; determining whether a state transition criterion is met; and in response to determining that the state transition criterion is met, operating in a second state; the operating in the first state including: receiving global navigation satellite system signals from a plurality of global navigation satellite system satellites; receiving a plurality of reference station measurements; receiving external error correction data; generating first position estimates with a Real-Time Kinematic method, based on the global navigation satellite system signals and on the reference station measurements; and generating second position estimates with a Precise Point Positioning method, based on the global navigation satellite system signals, on the external error correction data, and on first position estimates; the determining whether the state transition criterion is met including determining whether a measure of convergence of the Precise Point Positioning method meets a convergence criterion; and the operating in the second state including: receiving global navigation satellite system signals from a plurality of global navigation satellite system satellites, receiving external error correction data; and generating second position estimates with a Precise Point Positioning method, based on the global navigation satellite system signals, on the external error correction data, and on first position estimates.

In some embodiments, the receiving of a plurality of reference station measurements includes receiving a plurality of reference station measurements from a non-physical reference station.

In some embodiments, the method further includes operating in a third state before operating in the first state, the operating in the third state including not receiving global navigation satellite system signals from a plurality of global navigation satellite system satellites.

In some embodiments, the method further includes operating in a fourth state before operating in the third state, the measure of convergence of the Precise Point Positioning method meeting the convergence criterion while operating in the third state.

In some embodiments, an interval of time between the operating in the fourth state and the operating in the first state is less than four minutes.

In some embodiments, the measure of convergence is an estimated covariance of an extended Kalman filter of the Precise Point Positioning method and the convergence criterion is met when a magnitude of the estimated covariance is below a threshold.

In some embodiments, the generating of the first position estimates includes utilizing ionosphere-free combination.

In some embodiments, the generating of the first position estimates includes utilizing cascading ambiguity resolution.

In some embodiments, the receiving of global navigation satellite system signals from a plurality of global navigation satellite system satellites includes receiving global navigation satellite system signals from a Global Positioning System satellite.

In some embodiments, the receiving of global navigation satellite system signals from a plurality of global navigation satellite system satellites includes: receiving an L1 signal from a Global Positioning System satellite, and receiving an L2 signal from a Global Positioning System satellite.

According to some embodiments of the present disclosure, there is provided a system for estimating a position of a global navigation satellite system receiver, the system including: a first receiving circuit, for receiving global navigation satellite system signals; and a second receiving circuit, for receiving reference signals; and a processing circuit, the system being configured to: operate in a first state; determine whether a state transition criterion is met; and in response to determining that the state transition criterion is met, operate in a second state; the operating in the first state including: receiving, by the first receiving circuit, global navigation satellite system signals from a plurality of global navigation satellite system satellites; receiving, by the second receiving circuit, a plurality of reference station measurements; receiving, by the second receiving circuit, external error correction data; generating, by the processing circuit, first position estimates with a Real-Time Kinematic method, based on the global navigation satellite system signals and on the reference station measurements; and generating, by the processing circuit, second position estimates with a Precise Point Positioning method, based on the global navigation satellite system signals, on the external error correction data, and on first position estimates; the determining whether the state transition criterion is met including determining, by the processing circuit, whether a measure of convergence of the Precise Point Positioning method meets a convergence criterion; and the operating in the second state including: receiving, by the first receiving circuit, global navigation satellite system signals from a plurality of global navigation satellite system satellites, receiving, by the second receiving circuit, external error correction data; and generating, by the processing circuit, second position estimates with a Precise Point Positioning method, based on the global navigation satellite system signals, on the external error correction data, and on first position estimates.

In some embodiments, the receiving of a plurality of reference station measurements includes receiving a plurality of reference station measurements from a non-physical reference station.

In some embodiments, the system is further configured to operate in a third state before operating in the first state, the operating in the third state including not receiving global navigation satellite system signals from a plurality of global navigation satellite system satellites.

In some embodiments, the system is further configured to operate before operating in the third state, the measure of convergence of the Precise Point Positioning method meeting the convergence criterion while operating in the third state.

In some embodiments, an interval of time between the operating in the fourth state and the operating the first state is less than four minutes.

In some embodiments, the measure of convergence is an estimated covariance of an extended Kalman filter of the Precise Point Positioning method and the convergence criterion is met when a magnitude of the estimated covariance is below a threshold.

In some embodiments, the generating of the first position estimates includes utilizing ionosphere-free combination.

In some embodiments, the generating of the first position estimates includes utilizing cascading ambiguity resolution.

In some embodiments, the receiving of global navigation satellite system signals from a plurality of global navigation satellite system satellites includes receiving global navigation satellite system signals from a Global Positioning System satellite.

According to some embodiments of the present disclosure, there is provided a system for estimating a position of a global navigation satellite system receiver, the system including: first receiving means, for receiving global navigation satellite system signals; and second receiving means, for receiving terrestrial signals; and processing means, the system being configured to: operate in a first state; determine whether a state transition criterion is met; and in response to determining that the state transition criterion is met, operate in a second state; the operating in the first state including: receiving, by the first receiving means, global navigation satellite system signals from a plurality of global navigation satellite system satellites; receiving, by the second receiving means, a plurality of reference station measurements; receiving, by the second receiving means, external error correction data; generating, by the processing means, first position estimates with a Real-Time Kinematic method, based on the global navigation satellite system signals and on the reference station measurements; and generating, by the processing means, second position estimates with a Precise Point Positioning method, based on the global navigation satellite system signals, on the external error correction data, and on first position estimates; the determining whether the state transition criterion is met including determining, by the processing means, whether a measure of convergence of the Precise Point Positioning method meets a convergence criterion; and the operating in the second state including: receiving, by the first receiving means, global navigation satellite system signals from a plurality of global navigation satellite system satellites, receiving, by the second receiving means, external error correction data; and generating, by the processing means, second position estimates with a Precise Point Positioning method, based on the global navigation satellite system signals, on the external error correction data, and on first position estimates.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for accelerated Precise Point Positioning convergence provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Precise Point Positioning (PPP) is a global navigation satellite system (GNSS) positioning method that may be employed by a global navigation satellite system receiver to calculate precise positions. Precise Point Positioning may be used with such global navigation satellite systems as GPS, GLONASS, Galileo, and BeiDou. Precise Point Positioning may employ a combination of several global navigation satellite system position refinement techniques that may be suitable for use with relatively low-cost receiver hardware to yield highly precise position estimates. Precise Point Positioning may use a single global navigation satellite system receiver.

Figure 1:
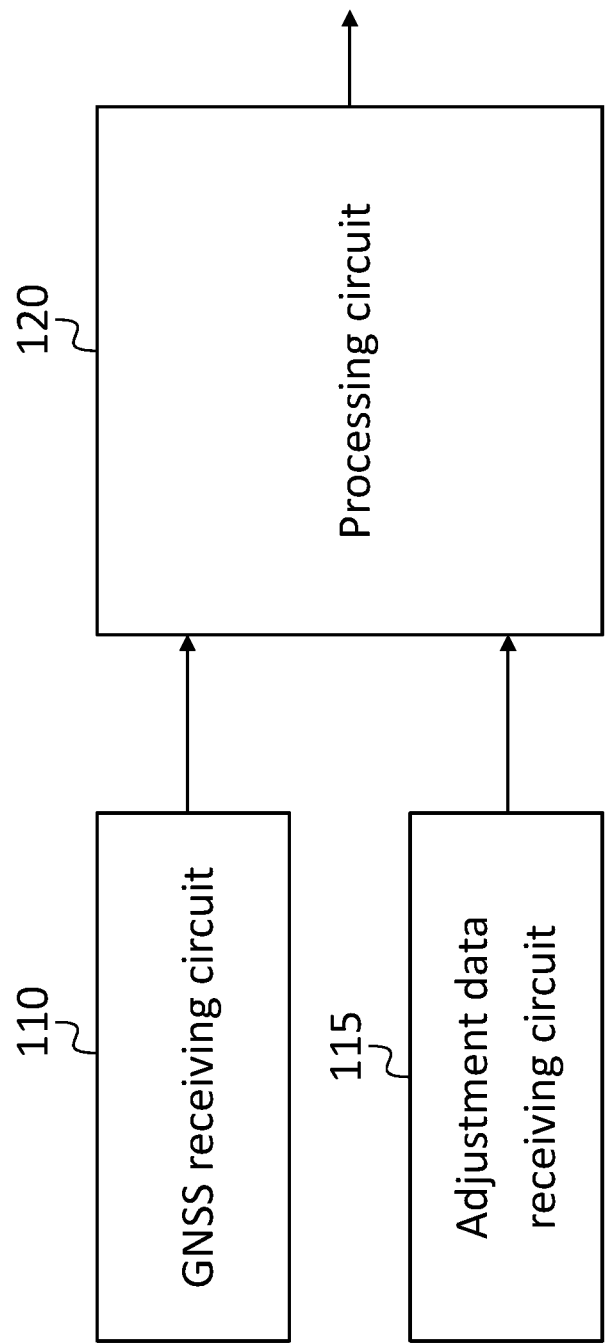
FIG. 1 is a block diagram of a system for forming high precision position estimates, according to an embodiment of the present disclosure.

A system for forming high precision position estimates using Precise Point Positioning may rely on two general sources of information: global navigation satellite system measurements, and data, or "external error correction data". In some embodiments the global navigation satellite system measurements may be sufficient only for forming relatively low precision coarse position estimates, and the combination of the global navigation satellite system measurements and the external error correction data may be used to generate position estimates with higher (i.e., improved) precision. FIG. 1 shows a system for forming high precision position estimates in some embodiments. Such a system may be referred to as a "global navigation satellite system receiver". A first receiving circuit 110 receives signals from a plurality of global navigation satellite system satellites, and a second receiving circuit 115 receives "adjustment data", which may include the external error correction data mentioned above and which may also include (simulated or physical) measurements that may be referred to as "reference station measurements" and that may be used for Real-time Kinematic (RTK) positioning (discussed in further detail below). The second receiving circuit 115 may be any suitable circuit for receiving adjustment data from a source of such data. For example, it may be a wireless circuit for communicating with a mobile telephone and data network (and, e.g., for receiving adjustment data from the Internet through such a network), or a circuit for receiving adjustment data from a communications satellite (e.g., a geostationary communications satellite) or a circuit for receiving data over a wired connection or a fiber-optic connection to the Internet. In some embodiments, the second receiving circuit 115 includes a plurality of circuits for receiving data from different respective sources; for example, it may include a satellite receiver circuit for receiving external error correction data (discussed in further detail below) from a geostationary communications satellite, and a wireless modem for communicating with a mobile telephone and data network to receive reference station measurements (discussed in further detail below).

The data received by (or generated from the signals received by) the first receiving circuit 110 and second receiving circuit 115 are fed to a processing circuit 120 (discussed in further detail below), which may form coarse position estimates based on the signal delays between the global navigation satellite system satellites and the first receiving circuit 110, and which may adjust these coarse position estimates, based on the adjustment data, to form improved precision position estimates.

The external error correction data used for Precise Point Positioning may include clock corrections and ephemerides (precise satellite orbits) for the global navigation satellite system satellites, and ionosphere and troposphere corrections. The update rates may be different for different correction terms. The processing circuit 120 may combine the data received from the first receiving circuit 110 and the second receiving circuit 115 in an extended Kalman filter, the output of which may include improved precision position estimates.

Figure 2:
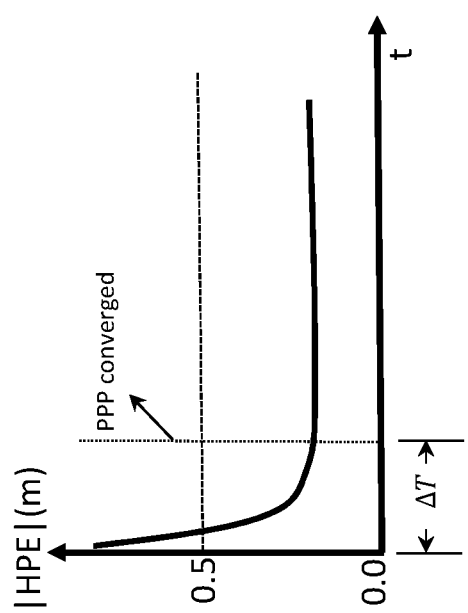
FIG. 2 is a graph of horizontal position error as a function of time, according to an embodiment of the present disclosure.

During operation, the precision of the improved precision position estimates may improve as the extended Kalman filter converges, e.g., as state estimates and Kalman gains generated and iteratively updated by the extended Kalman filter approach their steady-state values. FIG. 2 is a graph showing the horizontal position error of the improved precision position estimates generated by the extended Kalman filter as it converges. After a time ΔT, the horizontal position error is near (e.g., it is within 5% of or within 1% of) its steady state value, and the Precise Point Positioning extended Kalman filter may be said to have converged. The time ΔT that the extended Kalman filter takes to converge may be sufficiently long to cause a significant reduction in the usefulness, or in the commercial value, of a system for position estimation based on a global navigation satellite system using Precise Point Positioning.

For example, if a vehicle carrying a system for forming high precision position estimates drives through a tunnel, the signal from the global navigation satellite system satellites may be lost for a sufficiently long time that the horizontal position error of the improved precision position estimates generated by the extended Kalman filter may be quite large for a significant amount of time after the vehicle emerges from the tunnel, while the extended Kalman filter re-converges.

Figure 3:
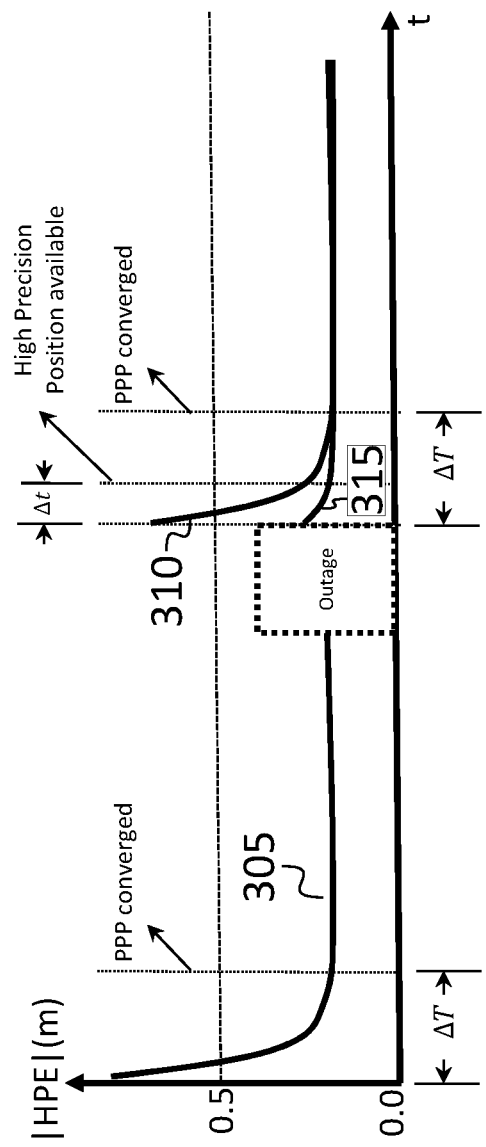
FIG. 3 is a graph of horizontal position error as a function of time, according to an embodiment of the present disclosure.

FIG. 3 shows the horizontal position error in two scenarios. In a first scenario, corresponding to first and second curves 305 and 310, the horizontal position error is large immediately after an outage, and remains large for a significant amount of time. In a second scenario, corresponding to first and third curves 305 and 315, precise position estimates (which are more precise than those produced by the Precise Point Positioning method immediately after an outage, but which may be less precise than those produced by the Precise Point Positioning method after the extended Kalman filter has converged) are available immediately after the outage. These precise position estimates may be produced by another method (different from Precise Point Positioning) such as the Real-Time Kinematic method (mentioned above and discussed in further detail below). The precise position estimates may be fed into the extended Kalman filter to accelerate its convergence, resulting in a shorter convergence interval, as shown in by the third curve 315 of FIG. 3.

Real-time Kinematic (RTK) positioning is a position estimation method that may be employed to enhance the precision of position data derived from a global navigation satellite system. It may use measurements of the phase of the global navigation satellite system signal's carrier wave, in addition to the information content of the global navigation satellite system signal, and may use a single physical reference station or an interpolated non-physical reference station to provide real-time corrections.

If a physical reference station is used, it may be at a precisely known position, and it may transmit measurements of carrier phase and code range (which may be referred to as "reference station measurements") to the system for forming high precision position estimates, which may form coarse position estimates from global navigation satellite system signals, and correct the coarse position estimates, using the reference station measurements, to remove certain errors from the coarse position estimates, and to form precise position estimates. The errors removed in this process may include clock errors in the global navigation satellite system satellites, errors in the knowledge of the ephemerides of the global navigation satellite system satellites, and non-uniform or time-varying ionospheric and tropospheric delays experienced by the signals from the global navigation satellite system satellites.

In some embodiments, a non-physical reference station (instead of a physical reference station) may provide reference station measurements to the system for forming high precision position estimates. Such a non-physical reference station may be implemented, for example, as a processing circuit that receives measurements from a network of physical reference stations and interpolates the measurements to construct measurements of carrier phase and code range that would be obtained, at a selected position, if a physical reference station were operating at the selected position. Such measurements may be referred to as "simulated reference station measurements". The non-physical reference station may be implemented in dedicated hardware or it may be implemented as part of a processing circuit (e.g., the processing circuit 120 of the system for forming high precision position estimates), or as software (e.g., software running in the processing circuit 120 of the system for forming high precision position estimates) or as a combination of hardware and software. The non-physical reference station may have a simulated location that is sufficiently close to the system for forming high precision position estimates that measurement errors are largely common to the (simulated) measurements of the non-physical reference station and those of the system for forming high precision position estimates. In some embodiments, the non-physical reference station (or the physical reference station, if one is available) is chosen to be less than 20 km (e.g., between 1.0 m and 20.0 km) from the location of the system for forming high precision position estimates. In some embodiments the non-physical reference station (or the physical reference station, if one is available) is chosen to be at the point at which an outage began, or the last point for which a precise position estimate is available, before an outage; this choice of location for the non-physical reference station (or for the physical reference station) may have the effect that only temporal extrapolation of errors, not spatial extrapolation, may be involved. As used herein, the "simulated location" of a non-physical reference station is the location corresponding to which it generates simulated reference station measurements.

Figure 4:
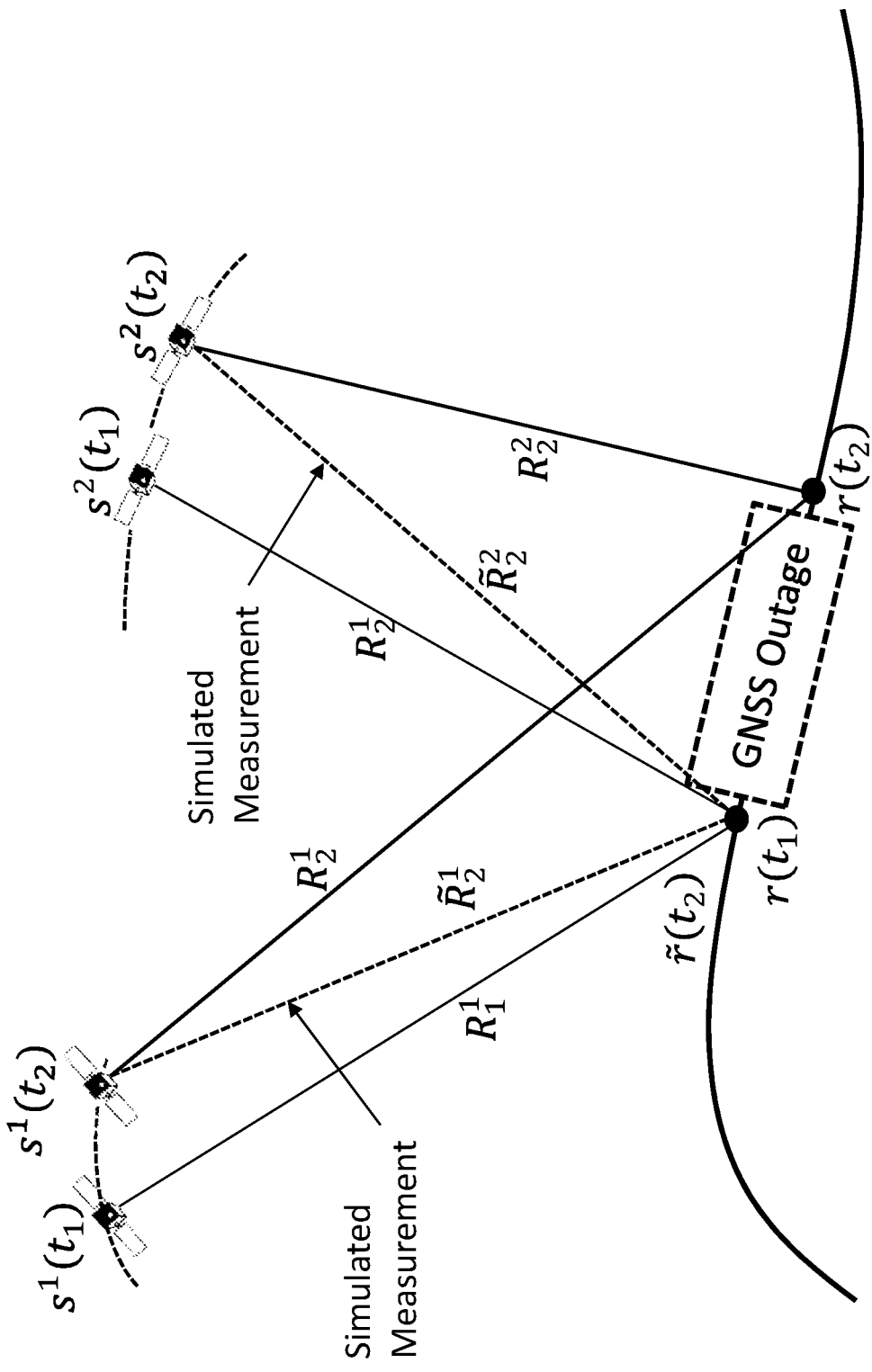
FIG. 4 is schematic illustration of satellites and receivers, according to an embodiment of the present disclosure.

The operation of a system employing a Real-Time Kinematic method, in one embodiment, is shown in FIG. 4. In FIG. 4, $r(t_k)$ is the receiver location at time epoch k, $t_1$ is the time epoch of the beginning of the outage, $t_2$ is the time epoch of the end of the outage, $\tilde{r}(t_k)$ is the position of the non-physical reference station at time epoch k, $R_k^i$ is the geometric range between the i-th satellite and the first receiving circuit 110 of the system for forming high precision position estimates at time epoch k, and $\tilde{R}_k^i$ is the geometric range between the i-th satellite and the non-physical reference station at time epoch k. In FIG. 4, "time epoch" refers to a position-dependent measure of time that has the characteristics that (i) the time epoch at which a satellite transmits a signal is the same as the time epoch at which the first receiving circuit 110 of the system for forming high precision position estimates receives the same signal, and that (ii) on the ground, the time epoch has the same value as the time. For example, $s^1(t_1)$ and $r(t_1)$ are used to represent the signal transmitted from satellite 1 and received at time epoch $t_1$ for simplicity, where $t_1$ does not represent the exact time tags for when signal leaves the satellite and when it arrives at the receiver. More exactly, for the same signal that is transmitted from satellite $s^1$ at time $t_1$, it should arrive at a receiver at $t_1+dt$, where dt is the time of signal travel in space.

In operation, the first receiving circuit 110 of the system for forming high precision position estimates obtains measurements of carrier phase and code range for each of the satellites, and the non-physical reference station generates simulated reference station measurements, and sends the simulated reference station measurements to the system for forming high precision position estimates, which uses the signals it receives from global navigation satellite system satellites, together with the simulated reference station measurements, to generate precise position estimates which are then fed to the extended Kalman filter to accelerate its convergence. In some embodiments, a physical reference station may be employed (e.g., if one is available near the position at which the outage ended); in such a circumstance, the physical reference station may send, to the system for forming high precision position estimates, (physical) reference station measurements (instead of simulated reference station measurements).

In some embodiments, precise position estimates generated using a Real-Time Kinematic method are used in other circumstances than immediately after an outage during which global navigation satellite system signals are temporarily unavailable, to accelerate convergence of the extended Kalman filter employed by the Precise Point Positioning method. For example, such precise position estimates may be used to accelerate the convergence of the extended Kalman filter employed by the Precise Point Positioning method at system startup, or to recover from other events that may result in a loss of convergence of the extended Kalman filter, such as a software error, or an error condition causing a temporary loss of function of the first receiving circuit 110. As used herein, an "outage" is any interval of time during which the system is not performing Precise Point Positioning, including any interval (before initial startup or a subsequent startup) when power to the system is shut off or has not been connected.

In some embodiments a method for estimating a position of a global navigation satellite system receiver may include operating in a first state, determining whether a state transition criterion is met, and, in response to determining that the state transition criterion is met, operating in a second state. The first state may be one in which precise position estimates are generated using a Real-Time Kinematic method and fed into the extended Kalman filter used in a Precise Point Positioning method, to accelerate its convergence.

Once a transition criterion is met (e.g., the extended Kalman filter has adequately converged, as determined, for example, by a measure of convergence of the Precise Point Positioning method meeting a convergence criterion) the global navigation satellite system receiver may transition to a second state, in which the Precise Point Positioning method is performed without precise position estimates from another source (e.g., from a Real-Time Kinematic method) being fed into the extended Kalman filter. In some embodiments, the measure of convergence is an estimate covariance of an extended Kalman filter of the precise point positioning method and the convergence criterion is met when a magnitude of the estimate covariance is below a threshold.

In some embodiments, the system may operate in the first state immediately after an outage (during which the system may operate in a third state, e.g., a state in which position estimates are not generated) and preceding the outage the system may be in a state (e.g., a fourth state) in which the Precise Point Positioning method has converged. In some embodiments the duration of the outage may be less than 4 minutes. In some embodiments, the system may employ ionosphere-free combination (e.g., based on the L1 and L2 signals of a GPS signal, in a GPS-based system), or cascading ambiguity resolution, or both, as part of the Precise Point Positioning method or of the Real-Time Kinematic method, or both.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s)

as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" (or "between 1.0 and 10.0") is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for accelerated Precise Point Positioning convergence have been specifically described and illustrated herein, many modifications and variations will be apparent to those skilled in the art. Accordingly, it is to be understood that a system and method for accelerated Precise Point Positioning convergence constructed according to principles of this disclosure may be embodied other than as specifically described herein. The invention is also defined in the following claims, and equivalents thereof.

What is claimed is:

1. A method for estimating a position of a global navigation satellite system receiver, the method comprising:
   operating in a first state;
   determining that a state transition criterion is met; and
   in response to determining that the state transition criterion is met, operating in a second state;
   the operating in the first state comprising:
      receiving global navigation satellite system signals from a plurality of global navigation satellite system satellites;
      receiving a plurality of reference station measurements;
      receiving external error correction data;
      generating first position estimates with a Real-Time Kinematic method, based on the global navigation satellite system signals and on the reference station measurements; and
      generating second position estimates with a Precise Point Positioning method, based on the global navigation satellite system signals, on the external error correction data, and on the first position estimates;
   the determining that the state transition criterion is met comprising determining that a measure of convergence of the Precise Point Positioning method meets a convergence criterion, wherein the measure of convergence is an estimated covariance of an extended Kalman filter of the Precise Point Positioning method and the convergence criterion is met when a magnitude of the estimated covariance is below a threshold; and
   the operating in the second state comprising:
      receiving global navigation satellite system signals from a plurality of global navigation satellite system satellites,
      receiving external error correction data; and
      generating the second position estimates with a Precise Point Positioning method, based on the global navigation satellite system signals, and on the external error correction data.

2. The method of claim 1, wherein the receiving of a plurality of reference station measurements comprises receiving a plurality of reference station measurements from a non-physical reference station.

3. The method of claim 1, further comprising operating in a third state before operating in the first state, the operating in the third state comprising not receiving global navigation satellite system signals from a plurality of global navigation satellite system satellites.

4. The method of claim 3, further comprising operating in a fourth state before operating in the third state, the measure of convergence of the Precise Point Positioning method meeting the convergence criterion while operating in the fourth state.

5. The method of claim 4, wherein an interval of time between the operating in the fourth state and the operating in the first state is less than four minutes.

6. The method of claim 1, wherein the generating of the first position estimates comprises utilizing ionosphere-free combination.

7. The method of claim 1, wherein the generating of the first position estimates comprises utilizing cascading ambiguity resolution.

8. The method of claim 1, wherein the receiving of global navigation satellite system signals from a plurality of global navigation satellite system satellites comprises receiving global navigation satellite system signals from a Global Positioning System satellite.

9. The method of claim 1, wherein the receiving of global navigation satellite system signals from a plurality of global navigation satellite system satellites comprises:
receiving an L1 signal from a Global Positioning System satellite, and
receiving an L2 signal from a Global Positioning System satellite.

10. A system for estimating a position of a global navigation satellite system receiver, the system comprising:
a first receiving circuit, for receiving global navigation satellite system signals; and
a second receiving circuit, for receiving reference signals; and
a processing circuit,
the system being configured to:
operate in a first state;
determine that a state transition criterion is met; and
in response to determining that the state transition criterion is met, operate in a second state;
the operating in the first state comprising:
receiving, by the first receiving circuit, global navigation satellite system signals from a plurality of global navigation satellite system satellites;
receiving, by the second receiving circuit, a plurality of reference station measurements;
receiving, by the second receiving circuit, external error correction data;
generating, by the processing circuit, first position estimates with a Real-Time Kinematic method, based on the global navigation satellite system signals and on the reference station measurements; and
generating, by the processing circuit, second position estimates with a Precise Point Positioning method, based on the global navigation satellite system signals, on the external error correction data, and on first position estimates;
the determining that the state transition criterion is met comprising determining, by the processing circuit, that a measure of convergence of the Precise Point Positioning method meets a convergence criterion, wherein the measure of convergence is an estimated covariance of an extended Kalman filter of the Precise Point Positioning method and the convergence criterion is met when a magnitude of the estimated covariance is below a threshold; and
the operating in the second state comprising:
receiving, by the first receiving circuit, global navigation satellite system signals from a plurality of global navigation satellite system satellites,
receiving, by the second receiving circuit, external error correction data; and
generating, by the processing circuit, the second position estimates with a Precise Point Positioning method, based on the global navigation satellite system signals, and on the external error correction data.

11. The system of claim 10, wherein the receiving of a plurality of reference station measurements comprises receiving a plurality of reference station measurements from a non-physical reference station.

12. The system of claim 10, further configured to operate in a third state before operating in the first state, the operating in the third state comprising not receiving global navigation satellite system signals from a plurality of global navigation satellite system satellites.

13. The system of claim 12, further configured to operate in a fourth state before operating in the third state, the measure of convergence of the Precise Point Positioning method meeting the convergence criterion while operating in the fourth state.

14. The system of claim 13, wherein an interval of time between the operating in the fourth state and the operating the first state is less than four minutes.

15. The system of claim 10, wherein the generating of the first position estimates comprises utilizing ionosphere-free combination.

16. The system of claim 10, wherein the generating of the first position estimates comprises utilizing cascading ambiguity resolution.

17. The system of claim 10, wherein the receiving of global navigation satellite system signals from a plurality of global navigation satellite system satellites comprises receiving global navigation satellite system signals from a Global Positioning System satellite.

18. A system for estimating a position of a global navigation satellite system receiver, the system comprising:
first receiving means, for receiving global navigation satellite system signals; and
second receiving means, for receiving terrestrial signals; and
processing means,
the system being configured to:
operate in a first state;
determine that a state transition criterion is met; and
in response to determining that the state transition criterion is met, operate in a second state;
the operating in the first state comprising:
receiving, by the first receiving means, global navigation satellite system signals from a plurality of global navigation satellite system satellites;
receiving, by the second receiving means, a plurality of reference station measurements;
receiving, by the second receiving means, external error correction data;
generating, by the processing means, first position estimates with a Real-Time Kinematic method, based on the global navigation satellite system signals and on the reference station measurements; and
generating, by the processing means, second position estimates with a Precise Point Positioning method, based on the global navigation satellite system signals, on the external error correction data, and on first position estimates;
the determining that the state transition criterion is met comprising determining, by the processing means, that a measure of convergence of the Precise Point Positioning method meets a convergence criterion, wherein the measure of convergence is an estimated covariance of an extended Kalman filter of the Precise Point Positioning method and the convergence criterion is met when a magnitude of the estimated covariance is below a threshold; and the operating in the second state comprising:
  receiving, by the first receiving means, global navigation satellite system signals from a plurality of global navigation satellite system satellites,
  receiving, by the second receiving means, external error correction data; and
  generating, by the processing means, the second position estimates with a Precise Point Positioning method, based on the global navigation satellite system signals, and on the external error correction data.

\* \* \* \* \*